United States Patent
Mordukhovich (10) Patent No.: US 11,970,058 B1
(45) Date of Patent: Apr. 30, 2024

(54) GEARBOX FOR ELECTRIC VEHICLE

(71) Applicant: FCA US LLC, Auburn Hills, MI (US)

(72) Inventor: Gregory Mordukhovich, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/456,555

(22) Filed: Aug. 28, 2023

(51) Int. Cl.
*B60K 17/04* (2006.01)
*B60K 1/00* (2006.01)
*F16H 37/08* (2006.01)

(52) U.S. Cl.
CPC ............ *B60K 17/046* (2013.01); *B60K 1/00* (2013.01); *F16H 37/0806* (2013.01); *B60K 2001/001* (2013.01); *F16H 2200/0021* (2013.01); *F16H 2200/0039* (2013.01); *F16H 2200/2012* (2013.01); *F16H 2200/2082* (2013.01)

(58) Field of Classification Search
CPC ... B60K 17/046; B60K 2001/001; F16H 3/62; F16H 37/0806; F16H 2200/0021; F16H 2200/0039; F16H 2200/2012; F16H 2200/2082
See application file for complete search history.

(56) References Cited

U.S. PATENT DOCUMENTS

| | | | |
|---|---|---|---|
| 5,845,732 A | 12/1998 | Taniguchi et al. | |
| 9,822,854 B1* | 11/2017 | Diemer | F16H 3/66 |
| 10,914,362 B2* | 2/2021 | Singh | B60K 6/547 |
| 2014/0106924 A1* | 4/2014 | Kienzle | F16H 3/62 475/275 |
| 2019/0283578 A1* | 9/2019 | Wang | B60K 17/346 |
| 2020/0062114 A1* | 2/2020 | Holmes | F16H 48/05 |

FOREIGN PATENT DOCUMENTS

WO  2020216504 A1  10/2020

\* cited by examiner

*Primary Examiner* — Edwin A Young
(74) *Attorney, Agent, or Firm* — Jeremy J. Klobucar (57) ABSTRACT

A three-speed gearbox assembly for an electric drive vehicle includes four planetary gear sets connected to an electric motor output. A first clutch is configured to selectively couple the motor output to the first planetary gear set. A second clutch is configured to selectively ground a first portion of the first planetary gear set and a portion of the second planetary gear set to a housing. A selectable one-way clutch (SOWC) is configured to selectively ground a second portion of the first planetary gear set. The gearbox assembly is selectively switchable between (i) a first gear where the SOWC is engaged and the first and second clutches are disengaged, (ii) a second gear where the second clutch is engaged and the first clutch and the SOWC are disengaged, and (iii) a third gear where the first clutch is engaged and the second clutch and the SOWC are disengaged.

19 Claims, 4 Drawing Sheets

| | A | B | SOWC |
|---|---|---|---|
| G1 | | | X |
| G2 | | X | |
| G3 | X | | |
| N | | | |

| Options | PGS1 | PGS2 | PGS3 | PGS4 | G1 | G2 | G3 |
|---|---|---|---|---|---|---|---|
| | R/S | | | | I/O | | |
| 1 | 2 | 2.77 | 2.6 | 1.380 | 15 | 9.8 | 7.2 |
| 2 | 1.6 | 2 | 2.26 | 1.44 | 15 | 9.78 | 6.52 |
| 3 | 1.4 | 1.8 | 2.215 | 1.44 | 15 | 10 | 6.43 |

GEARBOX FOR ELECTRIC VEHICLE

FIELD

The present application relates generally to electric drive modules for electric vehicles and, more particularly, to a three-speed electric drive module for electric and hybrid vehicles.

BACKGROUND

Electric vehicles typically have single speed gearboxes, which while providing great torque capability, are unable to provide sustained high torque or various other speeds. Such gearboxes may provide sustained high torque through higher ratio gearing, but this is not ideal for meeting range and performance requirements for on-road usage. Moreover, such gearboxes often have relatively complex gearing arrangements and increased packaging constraints. Accordingly, while such gearing systems work well for their intended purpose, there is a desire for improvement in the relevant art.

SUMMARY

In accordance with one example aspect of the invention, a three-speed gearbox assembly for an electric drive vehicle is provided. The gearbox assembly includes a housing, a first planetary gear set configured to selectively connect to an output of an electric motor, a second planetary gear set rotationally coupled to an output of the first planetary gear set, a third planetary gear set rotationally coupled to an output of the second planetary gear set and a first axle shaft of the vehicle, and a fourth planetary gear set rotationally coupled to an output of the third planetary gear set and a second axle shaft of the vehicle.

A first clutch is configured to selectively couple the electric motor output to the first planetary gear set. A second clutch is configured to selectively ground a first portion of the first planetary gear set and a portion of the second planetary gear set to the housing. A selectable one-way clutch (SOWC) is configured to selectively ground a second portion of the first planetary gear set. The gearbox assembly is selectively switchable between (i) a first gear where the SOWC is engaged and the first and second clutches are disengaged, (ii) a second gear where the second clutch is engaged and the first clutch and the SOWC are disengaged, and (iii) a third gear where the first clutch is engaged and the second clutch and the SOWC are disengaged.

In addition to the foregoing, the described gearbox assembly may include one or more of the following features: wherein the first planetary gear set includes a sun gear configured for common rotation with a sun gear of the second planetary gear set and selective coupling to the electric motor output via the first clutch, a carrier coupled to the SOWC, and a ring gear coupled to the second and third planetary gear sets; and wherein the second planetary gear set includes a sun gear coupled for common rotation with a sun gear of the first planetary gear set, a carrier coupled to an output of the first planetary gear set and an input of the third planetary gear set, and a ring gear configured to rotationally couple to the electric motor output.

In addition to the foregoing, the described gearbox assembly may include one or more of the following features: wherein the third planetary gear set includes a sun gear coupled to an output of the first and second planetary gear sets, a carrier configured to rotationally couple to the first axle shaft, and a ring gear rotationally coupled to the fourth planetary gear set; and wherein the fourth planetary gear set includes a sun gear rotationally coupled to an output of the third planetary gear set, a carrier grounded to the housing, and a ring gear configured to rotationally couple to the second axle shaft.

In addition to the foregoing, the described gearbox assembly may include one or more of the following features: a third clutch having first clutch plates coupled for common rotation with the first axle shaft, and second clutch plates coupled to an output of the fourth planetary gear set and coupled for common rotation with the second axle shaft, wherein the third clutch is selectively engaged to lock the first and second axle shafts to provide a locked differential function; wherein the first clutch is configured to selectively couple a sun gear of the first planetary gear set and a sun gear of the second planetary gear set for rotation with the electric motor output; and wherein the second clutch is configured to selectively ground a sun gear of the first planetary gear set and a sun gear of the second planetary gear set.

In addition to the foregoing, the described gearbox assembly may include one or more of the following features: wherein the SOWC is configured to selectively ground a carrier of the first planetary gear set; wherein the first clutch is configured to selectively couple a sun gear of the first planetary gear set and a sun gear of the second planetary gear set for rotation with the electric motor output, wherein the second clutch is configured to selectively ground the sun gear of the first planetary gear set and the sun gear of the second planetary gear set, and wherein the SOWC is configured to selectively ground a carrier of the first planetary gear set; and wherein the third and fourth planetary gear sets function as an open differential.

In accordance with another example aspect of the invention, an electric vehicle is provided. In one example, the electric vehicle includes an electric motor having an output shaft, first and second axle shafts, and a three-speed gearbox assembly operably coupled between the electric motor and the first and second axle shafts. The gearbox assembly includes a housing, a first planetary gear set selectively connectable to the electric motor output shaft, a second planetary gear set rotationally coupled to an output of the first planetary gear set, a third planetary gear set rotationally coupled to an output of the second planetary gear set and the first axle shaft, and a fourth planetary gear set rotationally coupled to an output of the third planetary gear set and the second axle shaft.

A first clutch is configured to selectively couple the electric motor output shaft to the first planetary gear set. A second clutch is configured to selectively ground a first portion of the first planetary gear set and a portion of the second planetary gear set to the housing. A selectable one-way clutch (SOWC) is configured to selectively ground a second portion of the first planetary gear set. The gearbox assembly is selectively switchable between (i) a first gear where the SOWC is engaged and the first and second clutches are disengaged, (ii) a second gear where the second clutch is engaged and the first clutch and the SOWC are disengaged, and (iii) a third gear where the first clutch is engaged and the second clutch and the SOWC are disengaged.

In addition to the foregoing, the described electric vehicle may include one or more of the following features: wherein the first planetary gear set includes a sun gear configured for common rotation with a sun gear of the second planetary gear set and selective coupling to the electric motor output shaft via the first clutch, a carrier coupled to the SOWC, and a ring gear coupled to the second and third planetary gear sets; and wherein the second planetary gear set includes a sun gear coupled for common rotation with a sun gear of the first planetary gear set, a carrier coupled to an output of the first planetary gear set and an input of the third planetary gear set, and a ring gear rotationally coupled to the electric motor output shaft.

In addition to the foregoing, the described electric vehicle may include one or more of the following features: wherein the third planetary gear set includes a sun gear coupled to an output of the first and second planetary gear sets, a carrier rotationally coupled to the first axle shaft, and a ring gear rotationally coupled to the fourth planetary gear set; and wherein the fourth planetary gear set includes a sun gear rotationally coupled to an output of the third planetary gear set, a carrier grounded to the housing, and a ring gear rotationally coupled to the second axle shaft.

In addition to the foregoing, the described electric vehicle may include one or more of the following features: a third clutch having first clutch plates coupled for common rotation with the first axle shaft, and second clutch plates coupled to an output of the fourth planetary gear set and coupled for common rotation with the second axle shaft, wherein the third clutch is selectively engaged to lock the first and second axle shafts to provide a locked differential function; wherein the first clutch is configured to selectively couple a sun gear of the first planetary gear set and a sun gear of the second planetary gear set for rotation with the electric motor output shaft, wherein the second clutch is configured to selectively ground the sun gear of the first planetary gear set and the sun gear of the second planetary gear set, and wherein the SOWC is configured to selectively ground a carrier of the first planetary gear set; and wherein the third and fourth planetary gear sets function as an open differential.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for an electric drive module (EDM) of an electric vehicle (EV). The EDM includes a three-speed coaxial (concentric) electric drive gearbox configured to provide a power-shift with maximum power density, efficiency, and minimum cost while maintaining NVH, reliability, durability, and shift quality. A first variation of the EDM is an open differential design that includes four planetary gearsets (including a differential), a multi-plate brake, a multi-plate clutch, and a selectable one-way clutch (SOWC). A second variation of the EDM is a closed differential design that includes four planetary gearsets (including a differential), a multi-plate brake, a multi-plate clutch, a SOWC, and an additional multi-plate clutch that adds closed (locking) differential functions for all gearing ratios. A third variation of the EDM includes three planetary gearsets (including a differential), two multi-plate brakes, and two multi-plate clutches with one clutch adding closed differential functions for all gearing ratios. One ratio may be provided with a locking option.

Figure 1:
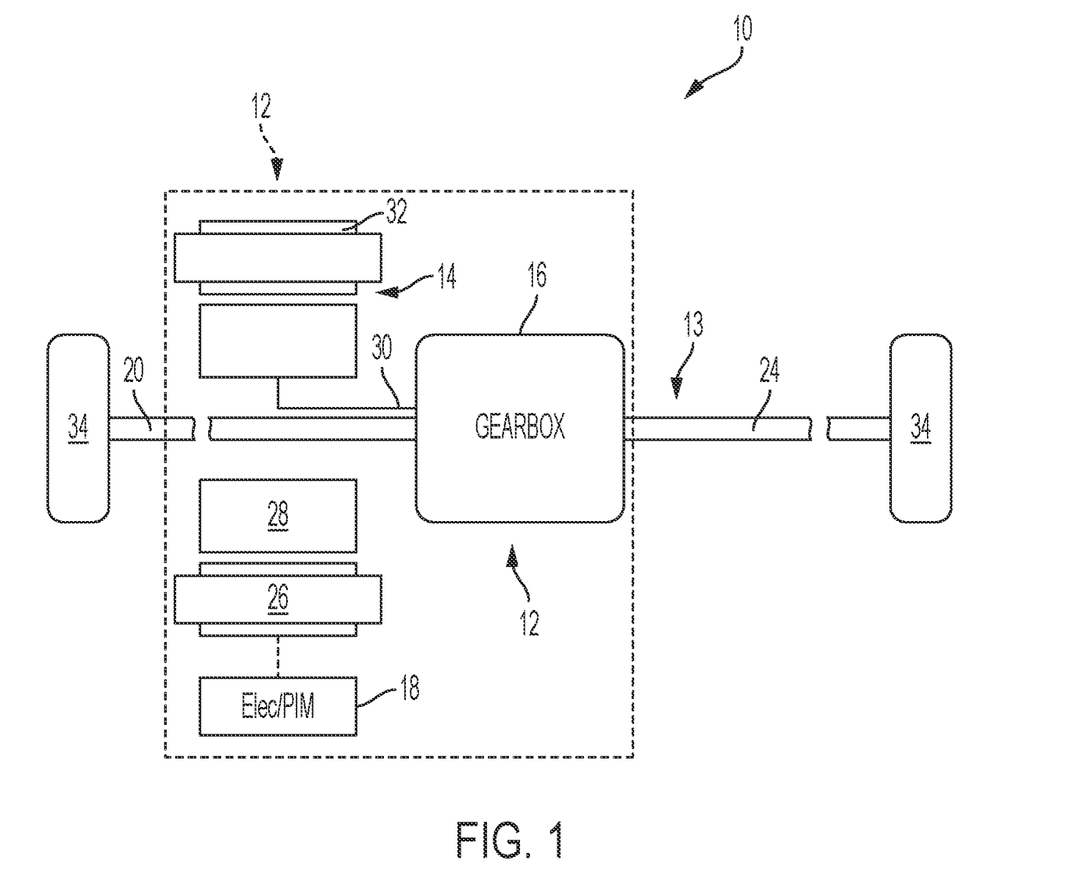
FIG. 1 is a schematic illustration of an example electric vehicle drivetrain having an electric drive module with a three-speed gearbox assembly, in accordance with the principles of the present application.

With initial reference to FIG. 1, a vehicle 10 is partially shown in accordance with the principles of the present disclosure. In the example embodiment, vehicle 10 includes an electric drive module (EDM) 12 configured to generate and transfer drive torque to a driveline 13 for vehicle propulsion. The EDM 12 generally includes one or more electric drive units or motors 14 (e.g., electric traction motors), an electric drive gearbox assembly 16, and power electronics including a power inverter module (PIM) 18. The electric motor 14 is selectively connectable via the PIM 18 to a high voltage battery system (not shown) for powering the electric motor 14. The gearbox assembly 16 is configured to transfer the generated drive torque to the driveline 13, including a first or left axle shaft 20 and a second or right axle shaft 24.

In the example embodiment, the electric motor 14 generally includes a stator 26, a rotor 28, and a rotor output shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34. In the illustrated example, the EDM 12 is configured for a rear axle (axles 20, 24) of the vehicle 10, but it will be appreciated that the systems and methods described herein are equally applicable to a front axle EDM configuration.

Figure 2:
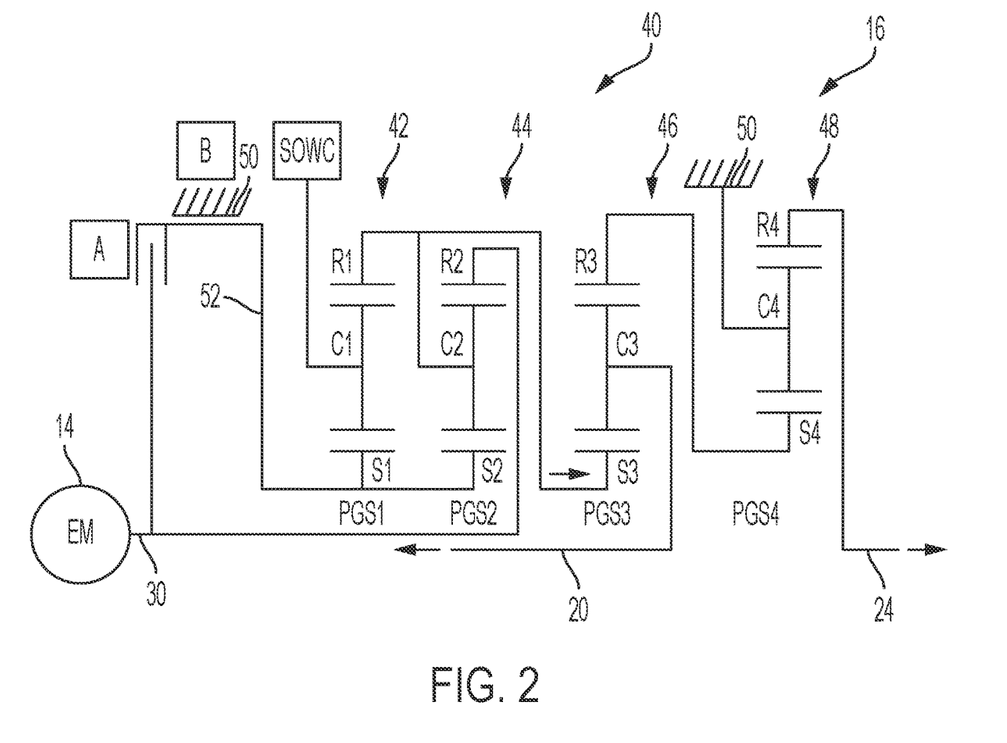
FIG. 2 is a schematic diagram of one example configuration of the gearbox assembly shown in FIG. 1, in accordance with the principles of the present application.

With reference now to FIG. 2, a first embodiment of the three-speed coaxial gearbox assembly 16 will be described in more detail. In the example embodiment, the gearbox assembly 16 is linked to the electric motor 14 through output shaft 30. Rotational output from the motor output shaft 30 is received by the gearbox assembly 16, which then transfers the rotational output through a gear set 40 to axles 20, 24.

In the example embodiment, the gear set 40 includes a first planetary gear set 42, a second planetary gear set 44, a third planetary gear set 46, a fourth planetary gear set 48, and a housing 50. The four planetary gear sets each generally include a sun gear 'S', a carrier 'C' supporting planet gears, and a ring gear 'R', where suffixes '1', '2', '3' and '4' refer to the first, second, third, and fourth planetary gear sets. The gearbox assembly 16 also includes a first Clutch A, a second Clutch B, and a selectable one-way clutch (SOWC). In the illustrated example, the Clutch A is a multi-plate clutch and Clutch B is a multi-plate brake. However, it will be appreciated that first Clutch A and/or second Clutch B may be any suitable type of clutch that enables gearbox assembly 16 to function as described herein.

In the example implementation, the first planetary gear set 42 is positioned between the electric motor 14 and the second planetary gear set 44. The sun gear 'S1' is connected for common rotation with an input gear 52 and sun gear 'S2'. The input gear 52 is selectively connected to the motor output shaft 30 via Clutch A, and selectively grounded to the housing 50 via Clutch B. Carrier 'C1' is connected to the SWOC, and ring gear 'R1' is connected to carrier 'C2' and sun gear 'S3'.

In the example embodiment, the second planetary gear set 44 is positioned between the first planetary gear set 42 and the third planetary gear set 46. The sun gear 'S2' is connected to the sun gear 'S1', the carrier 'C2' is connected to the ring gear 'R1' and sun gear 'S3', and the ring gear 'R2' is connected for common rotation with motor output shaft 30.

In the illustrated example, the third planetary gear set 46 is positioned between the second planetary gear set 44 and the fourth planetary gear set 48. The sun gear 'S3' is connected to receive input from ring gear 'R1' and carrier 'C2', carrier 'C3' is connected to transfer rotational motion to axle shaft 20, and ring gear 'R3' is connected to sun gear 'S4'.

The fourth planetary gear set 48 is positioned between the third planetary gear set 46 and the axle shaft 24. The sun gear 'S4' is connected to and receives input from ring gear 'R3'. Carrier 'C4' is grounded to the housing 50, and ring gear 'R4' is connected to transfer rotational motion to axle shaft 24.

Figure 3:
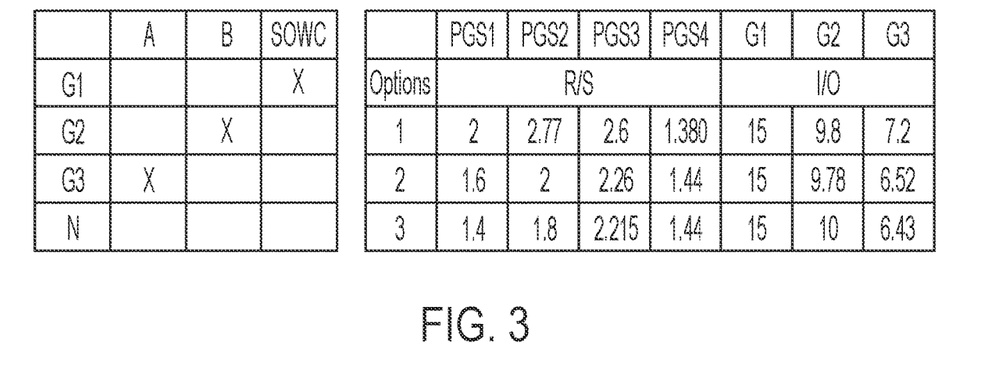
FIG. 3 is a table illustrating engagement of various clutches in connection with shifting various gears of the gearbox assembly shown in FIG. 2, in accordance with the principles of the present application.

FIG. 3 illustrates an exemplary shift pattern for the three-speed gearbox assembly 16. The tables illustrate the combination of clutches and brakes engageable to achieve specific torque input-to-output ratios. In the example tables, each clutch and brake combination corresponds to one of three forward gears (G1, G2, G3). Moreover, the gearbox assembly 16 utilizes planetary gear sets 46, 48 as a ratio but also to provide an open differential function.

With reference now to FIGS. 2 and 3, operation of the first embodiment of gearbox assembly 16 will be described in more detail. In the example operation, the gearbox assembly 16 operates in gear G1 by engaging the SOWC to ground or fix rotation of carrier 'C1' while Clutch A and Clutch B are disengaged. Rotation from motor output shaft 30 is transferred to the second planetary gear set 44, which then transfers the rotation to the third planetary gear set 46 via sun gear 'S3'. Rotation is then transferred to axle 20 via carrier 'C3' and to the fourth planetary gear set 48 via sun gear 'S4'. Rotation is then transferred to axle 24 via ring gear 'R4'.

To shift operation to gear G2, Clutch B is engaged to ground sun gears 'S1' and 'S2' to the housing 50 while Clutch A and the SOWC are disengaged. Rotation from motor output shaft 30 is transferred to the second planetary gear set 44, which then transfers the rotation to the third planetary gear set 46 via sun gear 'S3'. Rotation is then transferred to axle 20 via carrier 'C3' and to the fourth planetary gear set 48 via sun gear 'S4'. Rotation is then transferred to axle 24 via ring gear 'R4'.

To shift operation to gear G3, Clutch A is engaged to connect motor output shaft 30 to the input gear 52 while Clutch B and the SOWC are disengaged. Rotation from motor output shaft 30 is transferred to the first and second planetary gear sets 42, 44 via input gear 52 and sun gears 'S1' and 'S2', as well as via motor output shaft 30 and ring gear 'R2'. Rotation is then transferred to the third planetary gear set 46 via sun gear 'S3'. Rotation is then transferred to axle 20 via carrier 'C3' and to the fourth planetary gear set 48 via sun gear 'S4'. Rotation is then transferred to axle 24 via ring gear 'R4'.

Figure 4:
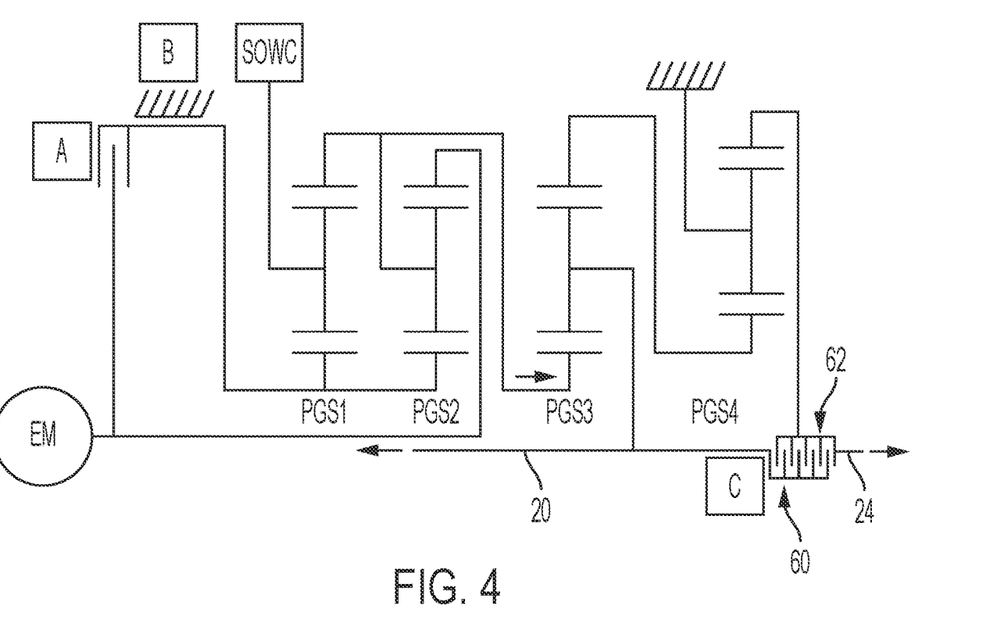
FIG. 4 is a schematic diagram of another example configuration of the gearbox assembly shown in FIG. 1, in accordance with the principles of the present application.

With reference now to FIG. 4, a second embodiment of the three-speed coaxial gearbox assembly 16 will be described in more detail. The second embodiment is the same or similar to the first embodiment (FIG. 2) except the gearbox assembly 16 further includes an additional Clutch C. Like reference numerals indicate like parts. In the example embodiment, Clutch C is a multi-plate clutch having a set of first clutches 60 interleaved with a set of second clutches 62. The first clutches 60 are connected for common rotation with axle shaft 20 and carrier 'C3', and the second clutches 62 are connected for common rotation with axle shaft 24 and ring gear 'R4'. Operation of the second embodiment of gearbox assembly 16 is the same or similar to the first embodiment (FIGS. 2 and 3), except Clutch C is selectively engaged for any of gears G1-G3 to provide a locking differential function for vehicle 10 without requiring a dedicated differential assembly.

Figure 5:
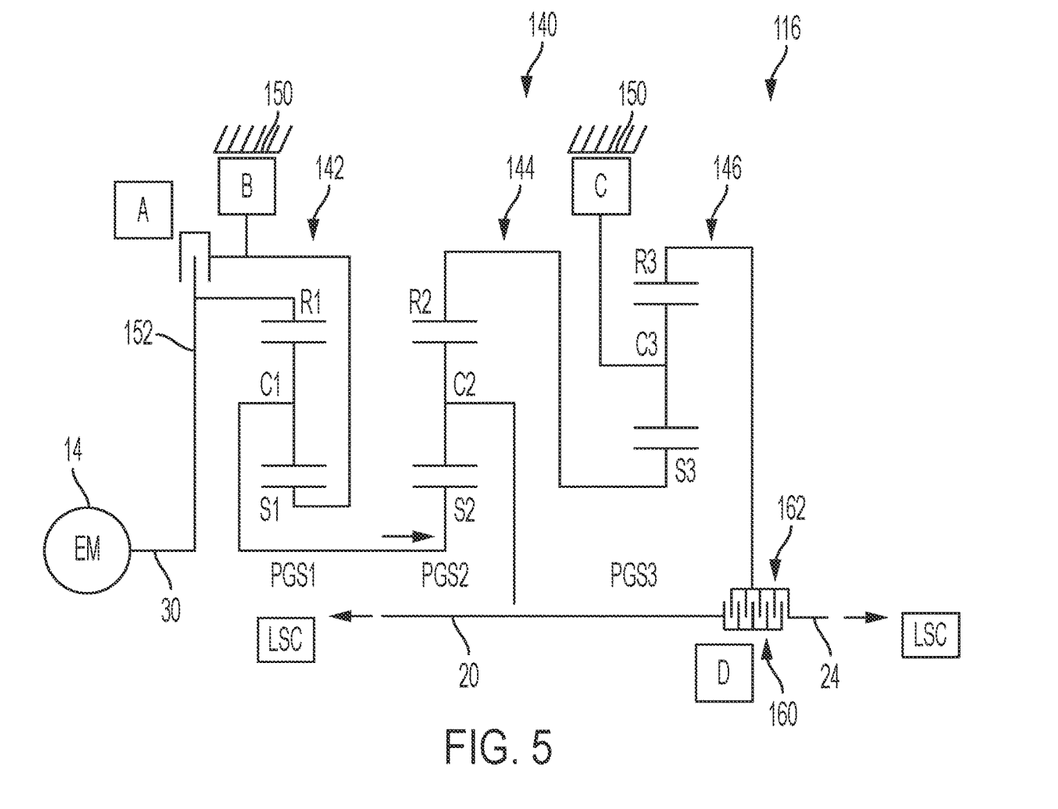
FIG. 5 is a schematic diagram of yet another example configuration of the gearbox assembly shown in FIG. 1, in accordance with the principles of the present application.

With reference now to FIG. 5, a third embodiment of the three-speed coaxial gearbox assembly is indicated at 116 and shown in accordance with the principles of the present disclosure. The gearbox assembly 116 may be utilized with EDM 12 and is linked to the electric motor 14 through output shaft 30. Rotational output from the motor output shaft 30 is received by the gearbox assembly 116, which then transfers the rotational output through a gearset 140 to axles 20, 24.

In the example embodiment, the gear set 140 includes a first planetary gear set 142, a second planetary gear set 144, a third planetary gear set 146, and a housing 150. The three planetary gear sets each generally include a sun gear 'S', a carrier 'C' supporting planet gears, and a ring gear 'R', where suffixes '1', '2' and '3' refer to the first, second, and third planetary gear sets. The gearbox assembly also includes a first Clutch A, a second Clutch B, a third Clutch C, a fourth Clutch D, and a pair of limited slip clutches LSC. Clutches A and D are multi-plate clutches and Clutches B and C are multi-plate brakes. However, it will be appreciated that the clutches may be any suitable type of clutch that enables gearbox assembly 116 to function as described herein.

In the example implementation, the first planetary gear set 142 is positioned between the electric motor 14 and the second planetary gear set 144. The ring gear 'R1' is connected for common rotation with the motor output shaft 30 via input gear 152. The sun gear 'S1' is selectively connected to the input gear 152 via Clutch A, and sun gear 'S1' is selectively grounded to the housing 150 via Clutch B. Carrier 'C1' is connected for common rotation with the sun gear 'S2'.

In the example embodiment, the second planetary gear set 144 is positioned between the first planetary gear set 142 and the third planetary gear set 146. The sun gear 'S2' is connected to receive rotational input from carrier 'C1', and carrier 'C2' is connected to transfer rotational motion to axle shaft 20. Ring gear 'R2' is connected to sun gear 'S3'.

In the illustrated example, the third planetary gear set 146 is positioned between the second planetary gear set 144 and the axle shaft 24. The sun gear 'S3' is connected to and receives input from ring gear 'R2', carrier 'C3' is selectively grounded to the housing 150 via Clutch C, and ring gear 'R3' is connected to transfer rotational motion to axle shaft 24.

In the example embodiment, Clutch D is a muti-plate clutch having a set of first clutches 160 interleaved with a set of second clutches 162. The first clutches 160 are connected for common rotation with axle shaft 20 and carrier 'C2', and the second clutches 162 are connected for common rotation with axle shaft 24 and ring gear 'R3'. Clutch D is selectively engaged for any of gears G1-G3 to provide a locking differential function for vehicle 10 without requiring a dedicated differential assembly. Additionally, each axle shaft 20 includes one limited slip clutch LSC to provide limited slip for an open differential function for vehicle 10 without requiring a dedicated differential assembly.

Figure 6:
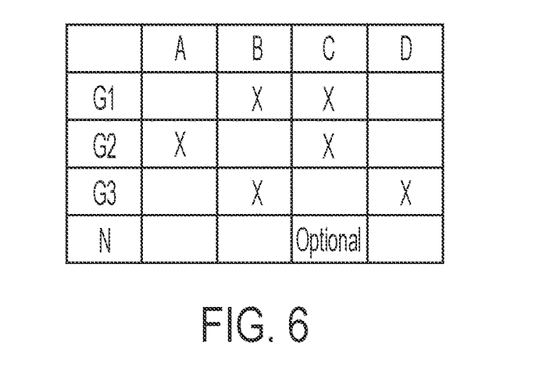
FIG. 6 is a table illustrating engagement of various clutches in connection with shifting various gears of the gearbox assembly shown in FIG. 5, in accordance with the principles of the present application.

FIG. 6 illustrates an exemplary shift pattern for the three-speed gearbox assembly 116. The table illustrates the combination of clutches and brakes engageable to achieve specific torque input-to-output ratios. In the example table, each clutch and brake combination corresponds to one of three forward gears (G1, G2, G3). Gears G1-G3 have the same or similar ratios as described in FIG. 3.

With reference now to FIGS. 5 and 6, operation of the gearbox assembly 116 will be described in more detail. In the example operation, the gearbox assembly 116 operates in gear G1 by engaging Clutches B and C to ground or fix rotation of sun gear 'S1' and carrier 'C3' while Clutches A and D are disengaged. Rotation from motor output shaft 30 is transferred to the first planetary gear set 142 through ring gear 'R1', and the rotation is transferred to the second planetary gear set 144 via sun gear 'S2'. Rotation is then transferred to axle 20 via carrier 'C2' as well as to the third planetary gear set 146 via sun gear 'S3'. Rotation is then transferred from the third planetary gear set 146 to axle 24 via ring gear 'R3'.

To shift operation to gear G2, Clutches A and C are engaged while Clutches B and D are disengaged. Engagement of Clutch A connects motor output shaft 30 and input gear 152 to sun gear 'S1', and engagement of Clutch C grounds carrier 'C3' to the housing 150. Rotation from motor output shaft 30 is transferred through the input gear 152 to sun gear 'S1' and ring gear 'R1' of the first planetary gear set 142, which then transfers the rotation through carrier 'C1' to sun gear 'S2' of the second planetary gear set 144. Rotation is then transferred to axle 20 via carrier 'C2' as well as to the third planetary gear set 146 via sun gear 'S3'. Rotation is then transferred from the third planetary gear set 146 to axle 24 via ring gear 'R3' while carrier 'C3' is grounded by Clutch C.

To shift operation to gear G3, Clutches B and D are engaged while Clutches A and C are disengaged. Engagement of Clutch B grounds sun gear 'S1' to the housing 150, and engagement of Clutch D locks the axles 20, 24 for common rotation. Rotation from motor output shaft 30 is transferred to the first planetary gear set 142 through ring gear 'R1', and the rotation is then transferred to the sun gear 'S2' of second planetary gear set 144 while sun gear 'S1' is grounded. Rotation is then transferred to axle 20 via carrier 'C2' as well as to the third planetary gear set 146 via sun gear 'S3'. Rotation is then transferred from the third planetary gear set 146 to axle shaft 24 via ring gear 'R3'. Because clutch D is engaged, planetary gear sets 144, 146 function as a locked differential, and axle shafts 20, 24 are locked for common rotation.

Described herein are systems and methods for a three-speed coaxial electric drive gearbox assembly for an electric vehicle. The three-speed gearbox assembly is configured to provide various gear ratios such as on-road and off-road gear ratios. To achieve the three-speed functionality, the gearbox assembly includes three or four planetary gear sets with selectively engageable clutches. Moreover, the gearbox assembly is configured to provide open, locked, and/or limited slip differential functionality without a dedicated differential assembly. As such, the described gearbox assembly advantageously does not require individual electric drive modules for each wheel or complex controls/mechanisms.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A three-speed gearbox assembly for an electric drive vehicle, the gearbox assembly comprising:
   a housing;
   a first planetary gear set configured to selectively connect to an output of an electric motor;
   a second planetary gear set rotationally coupled to an output of the first planetary gear set;
   a third planetary gear set rotationally coupled to an output of the second planetary gear set and a first axle shaft of the vehicle;
   a fourth planetary gear set rotationally coupled to an output of the third planetary gear set and a second axle shaft of the vehicle;
   a first clutch configured to selectively couple the electric motor output to the first planetary gear set;
   a second clutch configured to selectively ground a first portion of the first planetary gear set and a portion of the second planetary gear set to the housing; and
   a selectable one-way clutch (SOWC) configured to selectively ground a second portion of the first planetary gear set,
   wherein the gearbox assembly is selectively switchable between (i) a first gear where the SOWC is engaged and the first and second clutches are disengaged, (ii) a second gear where the second clutch is engaged and the first clutch and the SOWC are disengaged, and (iii) a third gear where the first clutch is engaged and the second clutch and the SOWC are disengaged.

2. The gearbox assembly of claim 1, wherein the first planetary gear set comprises:
 a sun gear configured for common rotation with a sun gear of the second planetary gear set and selective coupling to the electric motor output via the first clutch;
 a carrier coupled to the SOWC; and
 a ring gear coupled to the second and third planetary gear sets.

3. The gearbox assembly of claim 1, wherein the second planetary gear set comprises:
 a sun gear coupled for common rotation with a sun gear of the first planetary gear set;
 a carrier coupled to an output of the first planetary gear set and an input of the third planetary gear set; and
 a ring gear configured to rotationally couple to the electric motor output.

4. The gearbox assembly of claim 1, wherein the third planetary gear set comprises:
 a sun gear coupled to an output of the first and second planetary gear sets;
 a carrier configured to rotationally couple to the first axle shaft; and
 a ring gear rotationally coupled to the fourth planetary gear set.

5. The gearbox assembly of claim 1, wherein the fourth planetary gear set comprises:
 a sun gear rotationally coupled to an output of the third planetary gear set;
 a carrier grounded to the housing; and
 a ring gear configured to rotationally couple to the second axle shaft.

6. The gearbox assembly of claim 1, further comprising a third clutch having first clutch plates coupled for common rotation with the first axle shaft, and second clutch plates coupled to an output of the fourth planetary gear set and coupled for common rotation with the second axle shaft,
 wherein the third clutch is selectively engaged to lock the first and second axle shafts to provide a locked differential function.

7. The gearbox assembly of claim 1, wherein the first clutch is configured to selectively couple a sun gear of the first planetary gear set and a sun gear of the second planetary gear set for rotation with the electric motor output.

8. The gearbox assembly of claim 1, wherein the second clutch is configured to selectively ground a sun gear of the first planetary gear set and a sun gear of the second planetary gear set.

9. The gearbox assembly of claim 1, wherein the SOWC is configured to selectively ground a carrier of the first planetary gear set.

10. The gearbox assembly of claim 1, wherein the first clutch is configured to selectively couple a sun gear of the first planetary gear set and a sun gear of the second planetary gear set for rotation with the electric motor output,
 wherein the second clutch is configured to selectively ground the sun gear of the first planetary gear set and the sun gear of the second planetary gear set, and
 wherein the SOWC is configured to selectively ground a carrier of the first planetary gear set.

11. The gearbox assembly of claim 1, wherein the third and fourth planetary gear sets function as an open differential.

12. An electric vehicle, comprising:
 an electric motor having an output shaft;
 first and second axle shafts; and
 a three-speed gearbox assembly operably coupled between the electric motor and the first and second axle shafts, the gearbox assembly comprising:
  a housing;
  a first planetary gear set selectively connectable to the electric motor output shaft;
  a second planetary gear set rotationally coupled to an output of the first planetary gear set;
  a third planetary gear set rotationally coupled to an output of the second planetary gear set and the first axle shaft;
  a fourth planetary gear set rotationally coupled to an output of the third planetary gear set and the second axle shaft;
  a first clutch configured to selectively couple the electric motor output shaft to the first planetary gear set;
  a second clutch configured to selectively ground a first portion of the first planetary gear set and a portion of the second planetary gear set to the housing; and
  a selectable one-way clutch (SOWC) configured to selectively ground a second portion of the first planetary gear set,
  wherein the gearbox assembly is selectively switchable between (i) a first gear where the SOWC is engaged and the first and second clutches are disengaged, (ii) a second gear where the second clutch is engaged and the first clutch and the SOWC are disengaged, and (iii) a third gear where the first clutch is engaged and the second clutch and the SOWC are disengaged.

13. The electric vehicle of claim 12, wherein the first planetary gear set comprises:
 a sun gear configured for common rotation with a sun gear of the second planetary gear set and selective coupling to the electric motor output shaft via the first clutch;
 a carrier coupled to the SOWC; and
 a ring gear coupled to the second and third planetary gear sets.

14. The electric vehicle of claim 12, wherein the second planetary gear set comprises:
 a sun gear coupled for common rotation with a sun gear of the first planetary gear set;
 a carrier coupled to an output of the first planetary gear set and an input of the third planetary gear set; and
 a ring gear rotationally coupled to the electric motor output shaft.

15. The electric vehicle of claim 12, wherein the third planetary gear set comprises:
 a sun gear coupled to an output of the first and second planetary gear sets;
 a carrier rotationally coupled to the first axle shaft; and
 a ring gear rotationally coupled to the fourth planetary gear set.

16. The electric vehicle of claim 12, wherein the fourth planetary gear set comprises:
 a sun gear rotationally coupled to an output of the third planetary gear set;
 a carrier grounded to the housing; and
 a ring gear rotationally coupled to the second axle shaft.

17. The electric vehicle of claim 12, further comprising a third clutch having first clutch plates coupled for common rotation with the first axle shaft, and second clutch plates coupled to an output of the fourth planetary gear set and coupled for common rotation with the second axle shaft, wherein the third clutch is selectively engaged to lock the first and second axle shafts to provide a locked differential function.

18. The electric vehicle of claim 12, wherein the first clutch is configured to selectively couple a sun gear of the first planetary gear set and a sun gear of the second planetary gear set for rotation with the electric motor output shaft,
wherein the second clutch is configured to selectively ground the sun gear of the first planetary gear set and the sun gear of the second planetary gear set, and
wherein the SOWC is configured to selectively ground a carrier of the first planetary gear set.

19. The electric vehicle of claim 12, wherein the third and fourth planetary gear sets function as an open differential.

\* \* \* \* \*